United States Patent [19]
Grytz et al.

[11] Patent Number: 5,597,166
[45] Date of Patent: Jan. 28, 1997

[54] SEALING RING FOR A CONTACT PIN

[75] Inventors: Uwe Grytz, Bamberg; Ulrich Vieweg, Frensdorf, both of Germany

[73] Assignee: Robert Bosch GmbH, Stuttgart, Germany

[21] Appl. No.: 153,690

[22] Filed: Nov. 17, 1993

[30] Foreign Application Priority Data

Dec. 15, 1992 [DE] Germany .......................... 42 42 238.8

[51] Int. Cl.$^6$ .................................................... F16J 15/56
[52] U.S. Cl. ...................... 277/12; 277/165; 277/207 R
[58] Field of Search .......................... 277/DIG. 8, 207 R, 277/165, 12; 239/585.1–585.5

[56] References Cited

U.S. PATENT DOCUMENTS

| | | | |
|---|---|---|---|
| 2,473,284 | 6/1949 | Knaggs | 277/207 R X |
| 2,897,533 | 8/1959 | Bull et al. | 277/207 R X |
| 3,085,515 | 4/1963 | Workman | 277/DIG. 8 X |
| 3,317,214 | 5/1967 | Durgom | 277/170 |
| 3,575,431 | 4/1971 | Bryant | 277/207 R X |
| 3,690,849 | 9/1972 | Lansaque et al. | 277/207 R |
| 3,909,017 | 9/1975 | Engstrom | 277/207 R |
| 4,206,931 | 6/1980 | Tomita et al. | 277/166 |
| 4,305,595 | 12/1981 | Miyagishima et al. | 277/165 |
| 4,336,946 | 6/1982 | Wheeler | 277/165 |
| 4,345,739 | 8/1982 | Wheatley | 277/207 R X |
| 4,474,382 | 10/1984 | Hjelsand | 277/207 R |
| 5,131,667 | 7/1992 | Mong et al. | 277/207 R X |
| 5,261,677 | 11/1993 | Gotoh et al. | 277/207 R X |
| 5,375,812 | 12/1994 | Kent | 277/207 R X |

FOREIGN PATENT DOCUMENTS

| | | |
|---|---|---|
| 3143848A1 | 5/1983 | Germany . |
| 3324296A1 | 1/1985 | Germany . |
| 1025704 | 4/1966 | United Kingdom ............ 277/207 R |

Primary Examiner—William A. Cuchlinski, Jr.
Assistant Examiner—John L. Beres
Attorney, Agent, or Firm—Kenyon & Kenyon

[57] ABSTRACT

The invention provides sealing ring formed by a ring inner part and a bulge, the bulge extending radially outward at a right angle to a longitudinal axis of the ring so that a T-shaped cross section of the sealing ring is produced. The slightly conically extending inner surfaces of the sealing ring are pressed radially outward upon assembly so that a long guide area of the sealing ring on the contact pin is created which completely precludes any tilting of the sealing ring and increases the axial sealing. The sealing ring is particularly suitable for use in electromagnetically actuatable fuel injection valves.

10 Claims, 2 Drawing Sheets

SEALING RING FOR A CONTACT PIN

FIELD OF THE INVENTION

The present invention relates generally to sealing rings, and more particularly to sealing rings for fuel injection valves, including fuel injection valves which can be actuated electromagnetically.

BACKGROUND OF THE INVENTION

Sealing rings on contact pins that extend out of a magnet coil are already known from publications on fuel injection valves. As shown in FIGS. 1A (left sealing ring), 1B and 1C, known sealing rings are primarily concerned with radial sealing due to their shapes. FIGS. 1B and 1C for instance show sealing rings which have circular and barrel-shaped cross sections. In addition to the sealing rings shown in FIGS. 1B and 1C, sealing rings in the shape of quad-rings or in disk shape are also known.

These sealing rings are designed in such a way that they achieve only a radial sealing effect. If, as in the case of the sealing of contact pins of fuel injection valves, an axial sealing in addition to the radial sealing is also desired, the known shapes of sealing rings do not prove optimal. While sealing rings having a barrel shape or quadrings have relatively good sealing properties in the axial direction, the need for comparatively high assembly forces with these sealing rings is disadvantageous.

OBJECTS AND SUMMARY OF THE INVENTION

An object of the present invention is to provide a sealing ring that provides both good radial and axial sealing.

Another object of the invention is to provide for a sealing ring that allows for easy assembly.

The present invention therefore provides a sealing ring having an opening coaxial with a longitudinal axis of the ring comprising a ring inner part surrounding the opening; and a bulge which protrudes radially around the ring inner part and which protrudes axially along only a portion of the ring inner part. The bulge may protrude axially from the ring inner part one-third to one-half of the axial extent of the ring inner part. The bulge also may protrude axially in the middle of the ring inner part, so that the sealing ring has a T-shaped cross section.

The sealing ring may be used in a fuel injection valve comprising a housing part having at least one circular opening, the circular opening having a circular inner side; at least one contact pin for providing an electrical connection, the contact pin passing through the circular opening; a support body surrounding each contact pin at one end of the circular opening; a pressure member surrounding each contact pin at the other end of the circular opening; at least one sealing ring, the sealing ring having a ring inner part surrounding the contact pin and a bulge which protrudes radially around the ring inner part, the bulge protruding axially along only a portion of the ring inner part; the ring inner part extending axially between the support body and the pressure member to provide an axial seal for the contact pin; and the bulge radially contacting the circular inner side of the circular opening to provide a radial seal for the contact pin.

The sealing ring of the present invention therefore has the advantage of easy assembly and excellent radial and axial sealing. The sealing ring of the invention is particularly suitable for the sealing of contact pins upon the presence of alcohol-containing fuels, since an electrochemical corrosion of contact pins can be avoided with this sealing ring. The improved assembly capability and safety are particularly advantageous as compared with the known sealing rings. The sealing ring of the invention is designed in such a manner that upon the fitting of the sealing ring, the outer radial sealing region yields. Assembly forces thus can be kept to a minimum.

Another advantage of the present invention is that inner surfaces of the sealing ring are developed at an angle to a longitudinal axis of the ring, the inner surfaces yielding radially upon the pushing on of the sealing ring onto the contact pin and applying themselves optimally against the contact pin after assembly. This creates a long inner guide region of the sealing ring on the contact pin which completely precludes any tilting or inclination of the sealing ring and considerably increases the axial seal.

A further advantage of the present invention is that increased safety upon assembly is achieved due to the precisely determined sealing region, in which the axial sealing ring ends are provided with generous roundings which permit a simple gliding on of the sealing ring onto the contact pin. It is furthermore advantageous that compensation for axial tolerance is made possible with the sealing ring of the present invention.

BRIEF DESCRIPTION OF THE DRAWINGS

An embodiment of the present invention is shown in simplified manner in the drawing and will be explained in greater detail in the following specification.

DETAILED DESCRIPTION

Figures 1A, 1B, 1C:
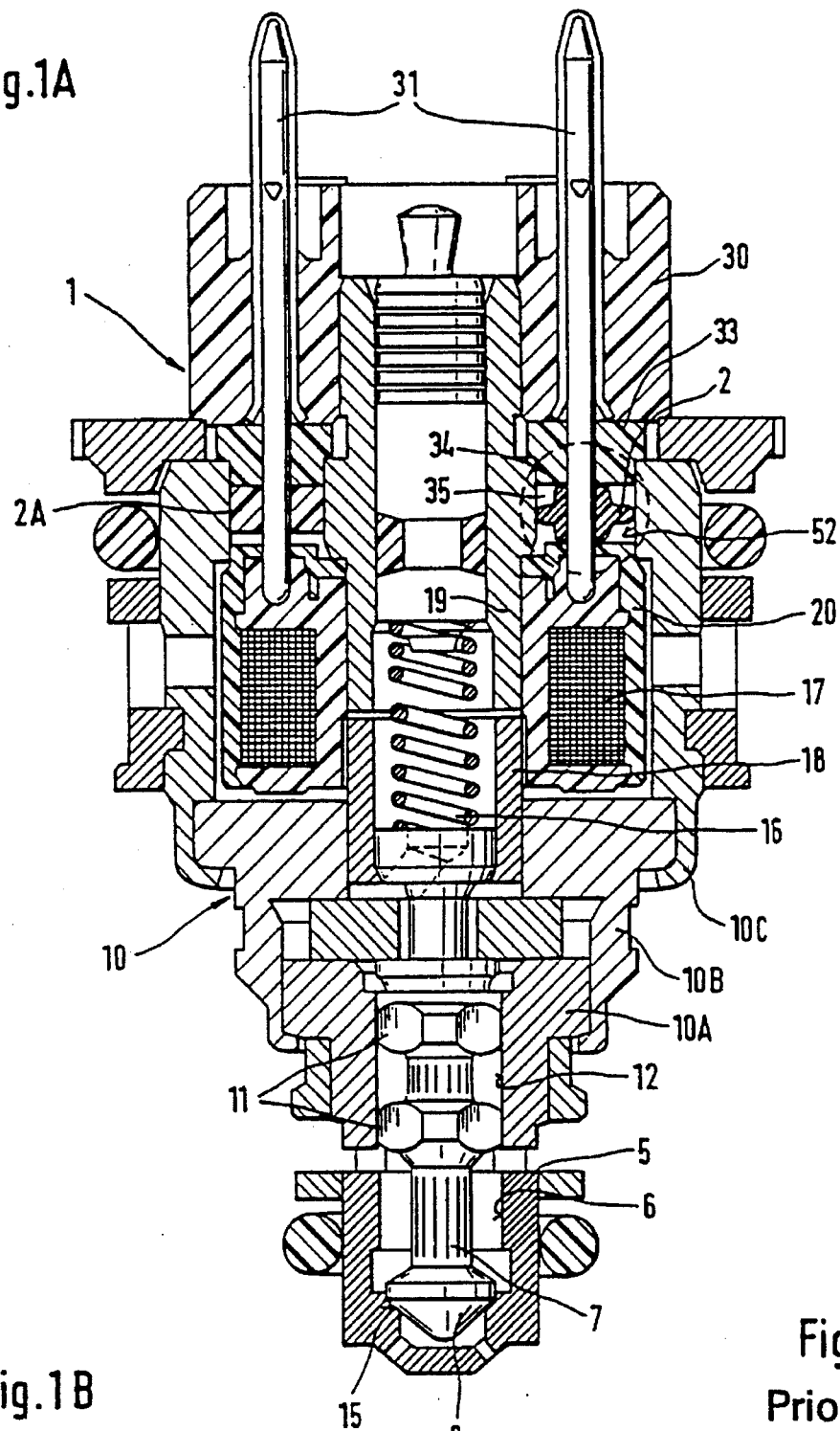
FIG. 1A shows a fuel injection valve having a sealing ring already known and a sealing ring according to the invention shown by a dashed line.
FIGS. 1B and 1C show sealing rings according to the prior art.

FIG. 1A shows an injection valve 1 for fuel injection systems of mixture-compressing internal combustion engines having externally supplied ignition, in which 0-Rings are inserted for sealing in a conventional manner. For the injection valve 1 a variety of known types of injection valves can be used. The injection valve 1 of FIG. 1A serves merely as example for injection valves which can be equipped with a sealing ring 2 according to the invention.

The sealing ring 2 of the invention is indicated by a circular dashed line in FIG. 1A on the right hand side, while on the left side there is shown a sealing ring 2A which corresponds to an embodiment of the prior art.

The injection valve 1 has a stepped, tubular valve seat support 5 which is provided with a concentric longitudinal opening 6. A valve needle 7 is arranged in the longitudinal opening 6, the valve needle being connected at its downstream end to a valve closure body 8. A valve housing 10 which serves as housing is for instance formed of several stepped concentric housing parts 10A, 10B, 10C. The valve needle 7 has, for instance, two guide sections 11 which serve to guide the valve needle 7 along a guide area of the wall of a longitudinal hole 12 in the housing part 10A of the valve housing 10. The valve seat support 5 has at its downstream end a fixed valve seat 15 which forms a seat valve together with the downstream end of the valve closure body 8.

Actuation of the injection valve 1 takes place in a known manner, for instance electromagnetically. An electromagnetic circuit having a coaxial magnet coil 17, a coaxial hollow cylindrical armature 18 and a coaxial hollow cylindrical core 19 serves to axially move the valve needle 7, thus allowing for the opening against the spring force of a restoring spring 16 or for the closing of the injection valve 1. The armature 18 is firmly connected in a sealed relationship, for instance by a weld seam, to the end of the valve needle 7 facing away from the valve closure body 8 and it is aligned with the core 19. The magnet coil 17 is surrounded by a support body 20, for instance made of plastic, which radially surrounds the core 19.

The electromagnet comprising housing part 10C, which serves as a magnet pot, the hollow cylindrical core 19, the magnet coil 17, which is surrounded by the support body 20, and the armature 18 can be triggered via a plug 30 having for instance two pins 31 leading to the magnet coil 17 and forming contact pins. The electromagnet can raise the valve needle 7 against the spring force of the restoring spring 16 so that the valve closure body 8 is raised from the valve seat 15 for the duration of the magnet excitation.

Upstream of the support body 20, sealing rings 2 are arranged around the cylindrical contact pins 31 extending out of the support body 20. In FIGS. 1A, 1B and 1C there are sealing rings 2A, 2B and 2C whose embodiments are already known. Thus, as shown in FIG. 1B, sealing rings 2B having circular cross sections are for instance used for sealing the contact pins 31 of the magnet coil 17 on injection valves 1. Sealing rings 2B in this or a similar shape, however, provide a complete seal only in radial direction. Axial tolerances cannot or can scarcely be compensated for with such sealing rings 2B. Sealing rings 2C (FIG. 1C) which have barrel-shaped cross sections are also known. These rings prove to be disadvantageous in that relatively very high assembly forces must be expended. The sealing ring 2 of the invention therefore has a T-shaped cross section in order to assure radial and at the same time axial sealing on the contact pins 31.

Figure 3:
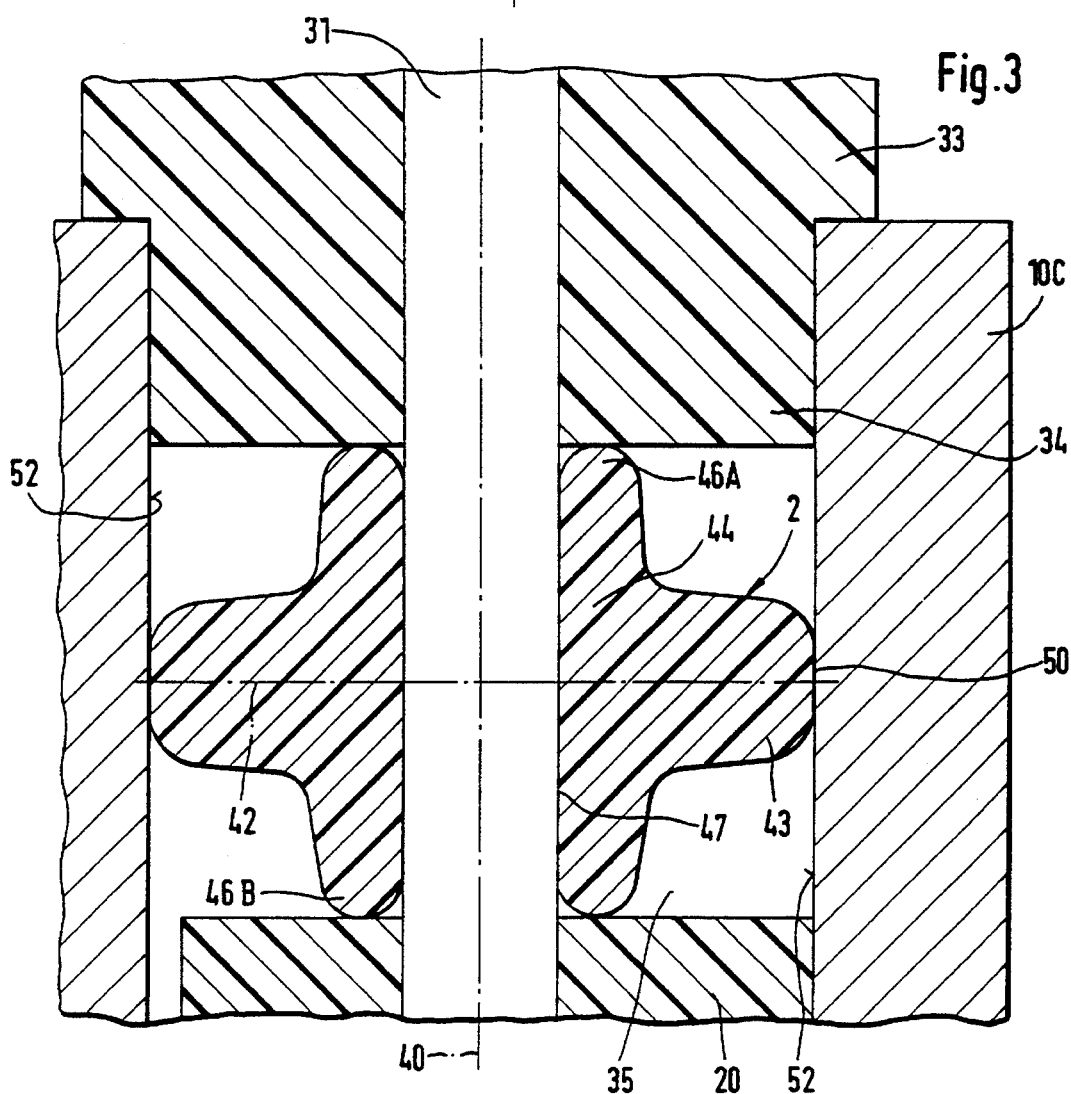
FIG. 3 shows a mounted sealing ring according to the invention.

A pressure member 33 of plastic is placed onto the housing part 10C on the side of the sealing ring 2 facing away from the magnet coil 17 and extends with a hollow cylindrical section 34 in axial direction up to the sealing ring 2 precisely into an opening 35 of the housing part 10C which surrounds the sealing ring 2 and presses the sealing ring 2 against the opposite support body 20 which for instance extends partially into the opening 35. FIG. 3 shows an installed T-shaped sealing ring 2 which partially surrounds the contact pin 31, the pressure member 33 with its section 34 which is applied against the sealing ring 2 and the support body 20.

Figure 2:
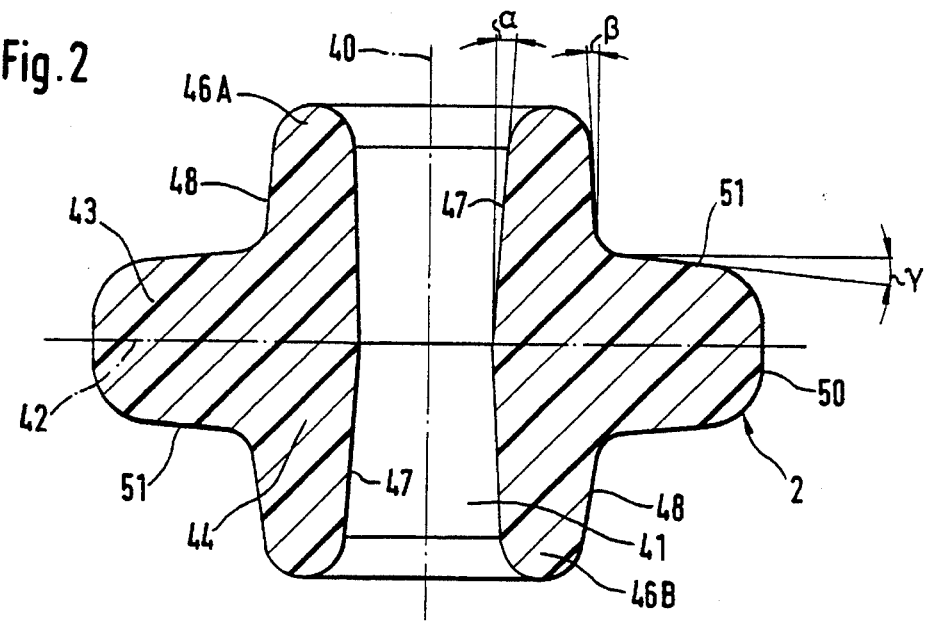
FIG. 2 shows the sealing ring according to the invention.

FIG. 2 shows a sectional view of the shape of the T-shaped sealing ring 2. The sealing ring 2 is developed concentrically around a longitudinal axis 40 of the ring. A passage opening 41 is provided in the center around the longitudinal axis 40 of the ring, the passage opening being not cylindrical in the disassembled state of the sealing ring 2 and serving to receive the contact pin 31. A transverse plane 42 extended through the sealing ring 2 perpendicular to the longitudinal axis 40 of the ring divides the sealing ring in an axially symmetrical manner. Around the transverse plane 42, there is developed in the axial direction and symmetrically a bulge 43 which extends radially outward by 360°, i.e. facing away from the longitudinal axis 40 of the ring. The bulge 43 extends radially out of a ring inner part 44, which extends substantially parallel to the longitudinal axis 40 of the ring and has a shape similar to a hollow cylinder. The axial extent of the ring inner part 44 is in this case two to three times as large as the axial width of the bulge 43 and extends on both sides beyond the bulge 43.

The central axial passage opening 41 in the sealing ring 2 has its smallest diameter at the level of the transverse plane 42. Seen outward in axial direction, the passage opening 41 broadens continuously at an angle up to sealing ring ends 46A and 46B, which are rounded in order to simplify a pushing of the sealing ring 2 onto the contact pin 31. Only in the region of the sealing ring ends 46A and 46B is the diameter of the passage opening 41 larger than the diameter of the contact pin 31. The angles between imaginary vertical lines, which extend parallel to the longitudinal axis 40 of the ring, and inclined inner surfaces 47 of the ring inner part 44 of the sealing ring 2, which at the same time delineate the passage opening 41, amount in disassembled condition for instance to 1° to 5°. Due to the inner surfaces 47 which extend in the direction towards the transverse plane 42 towards each other in a slightly conical manner, assurance is had that after placing the sealing ring 2 onto the contact pin 31, there is optimal axial application of the sealing ring 2 against the contact pin 31 and the sealing action is thus increased.

The ring inner part 44 is developed in such a manner that the outer surfaces 48 facing away from the longitudinal axis 40 of the ring also extend at an angle, here designated β, to imaginary vertical lines which extend parallel to the longitudinal axis 40 of the ring. In the same manner as the inner surfaces 47, the outer surfaces 48 are also developed at an angle β only up to the sealing ring ends 46A and 46B. The angles β amount for instance also to 1° to 5°. The sealing ring ends 46A and 46B are developed to extend by 360° on both axial sides of the sealing ring 2 and form thereby the connection between inner surfaces 47 and outer surfaces 48 of the ring inner part 44 of the sealing ring 2.

The radial outer termination of the bulge 43 and thus also of the entire T-shaped sealing ring 2 is formed by an outer bulge surface 50 extending around 360°. The bulge surface 50 extends for instance parallel to the longitudinal axis 40 of the ring, but it can also be curved. Radial surfaces 51 which define the outer contour of the bulge 43 are also designed at an angle, here designated γ. The angle γ results between imaginary horizontal lines which extend parallel to the transverse plane 42 and the inclined radial surfaces 51 of the bulge 43. For the angle γ, values between 2° and 8° are conceivable. The transitions between the individual surfaces on the sealing ring 2 are always developed continuously with radii. Thus, both the transition of outer surfaces 48 of the ring inner part 44 to the radial surfaces 51 of the bulge 43 and the transition of the radial surfaces 51 of the bulge 43 to the outer bulge surface 50 are rounded.

The sealing ring 2 is made of an elastomeric material. By means of the sealing ring 2 between the opening 35 and the contact pin 31 a very good radial and, at the same time, an axial sealing which is also desired takes place. By the inventive shape of the sealing ring 2 with rounded sealing ring ends 46A and 46B assembly safety is furthermore increased as compared with the seals already known.

FIG. 3 shows a partial section through the injection valve 1 of FIG. 1A in which a contact pin 31, which passes through the opening 35 and which has a sealing ring 2 arranged on it, is in installed condition. It can be seen in this figure how the inner surfaces 47 of the sealing ring 2, which extend conically towards each other in the disassembled condition in a direction towards the transverse plane 42, are pressed radially outward in the installed condition by the contact pin 31 so that the inner surfaces 47 extend parallel to the longitudinal axis 40 of the ring. In this way, a long guide area of the sealing ring 2 on the contact pin 31 which completely precludes any tilting of the sealing ring 2 and substantially increases the axial sealing is created.

Radial sealing takes place with the outer bulge surface 50 of the sealing ring 2 which is tightly applied over 360° against a circular inner side 52 of the opening 35 of the hosing part 10C.

The hollow cylindrical section 34 of the pressure member 33 extends in axial direction into the circular opening 35 of the housing part 10C and presses, while being applied against the sealing ring end 46A, the other opposite sealing ring end 46B against the support body 20 which extends for instance partially into the opening 35. Due to the axial clamping of the ring inner part 44 between the pressure member 33 of the support body 20, an axial sealing of the contact pin 31 is achieved so that any medium, such as alcohol-containing fuel which is present within the injection valve 1, cannot pass to the contact pins 31 thus avoiding an electrochemical corrosion of the contact pins 31.

While the sealing ring of the present invention is shown as having a T-shaped cross-section, other sealing rings with similar cross sections that provide good axial sealing and have bulges that provide good radial sealing and allow for ease of assembly are also contemplated as within the scope of the present invention.

We claim:

1. A fuel injection valve comprising:
   a housing part having at least one circular opening, the circular opening having a circular inner side;
   at least one contact pin for providing an electrical connection, the contact pin passing through the circular opening;
   a support body surrounding each contact pin at one end of the circular opening;
   a pressure member surrounding each contact pin at the other end of the circular opening;
   at least one sealing ring, the sealing ring having a ring inner part surrounding the contact pin and a bulge which protrudes radially around the ring inner part, the bulge protruding axially in the middle of the ring inner part, so that the sealing ring has a T-shaped cross section;
   the ring inner part extending axially between the support body and the pressure member to provide an axial seal for the contact pin; and
   the bulge contacting the circular inner side of the circular opening to provide a radial seal for the contact pin.

2. The fuel injection valve as recited in claim 1, wherein the bulge protrudes axially along one-third to one-half of the axial extent of the ring inner part.

3. The fuel injection valve as recited in claim 1, wherein the bulge protrudes axially from the ring inner part one-third to one-half of the axial extent of the ring inner part.

4. The fuel injection valve as recited in claim 1, wherein ends of the ring inner part are rounded.

5. A fuel injection valve as recited in claim 1, wherein the sealing ring is made of an elastomeric material.

6. A sealing arrangement including a sealing ring and contact pin, the sealing ring sealing the contact pin in an electromagnetically actuatable injection valve, the sealing ring comprising:
   an opening coaxial with a longitudinal axis of the ring;
   a ring inner part surrounding the opening and including a first sealing end for abutting a pressure member and a second sealing end for abutting a support body; and
   a bulge which protrudes radially around the ring inner part, the bulge abutting an inner surface of an outer opening between the pressure member and the support body,
   wherein:
      the bulge protrudes axially along a middle portion of the ring inner part, so that the sealing ring has a T-shaped cross section,
      the opening of the sealing ring receives the contact pin which extends axially through the outer opening between the pressure member and the support body, and
      the sealing ring is made entirely of an elastomeric material.

7. The sealing arrangement as recited in claim 6, wherein the opening of the sealing ring is delineated by an inner surface, the inner surface being inclined to the longitudinal axis of the ring.

8. A sealing ring for sealing a contact pin in an electromagnetically actuatable injection valve, the sealing ring comprising:
   an opening coaxial with a longitudinal axis of the ring, the opening of the sealing ring being eliminate by an inner surface, the inner surface being inclined to the longitudinal axis of the ring, the opening having smallest diameter at a transverse plane perpendicular to the longitudinal axis of the ring, the transverse plane dividing the ring inner part with axial symmetry;
   ring inner part surrounding the opening and including a first sealing end for abutting a pressure member an a second sealing end for butting a support body; and
   a bulge which protrudes radially around the ring inner part for abutting an inner surface of an outer opening between the pressure member and the support body,
   wherein:
      the bulge protrudes axially along middle portion of the ring inner part, so that the sealing ring has a T-shaped cross section,
      the opening of the sealing ring receives the contact pin which extends axially through the outer opening between the pressure member and the support body and
      the sealing ring is made entirely of an elastomeric material.

9. The sealing ring as recited in claim 8, wherein the inner surface of the opening widens at an angle of between 1° and 5° extending from the transverse plane up to ends of the ring inner part.

10. A sealing ring for sealing a contact pin in an electromagnetically actuatable injection valve, the sealing ring comprising:
   an opening coaxial with a longitudinal axis of the ring;
   a ring inner part surrounding the opening and including a first sealing end for abutting a pressure member and a second sealing end for abutting a support body, the first and second sealing ends of the ring inner part having a rounded shape; and
   a bulge which protrudes radially around the ring inner part for abutting an inner surface of an outer opening between the pressure member and the support body,
   wherein:
      the bulge protrudes axially along a middle portion of the ring inner part so that the sealing ring has a T-shape cross section,
      the opening of the sealing ring receives the contact pin which extends axially through the outer opening between the pressure member and the support body, and
      the sealing ring is made entirely of an elastomeric material.

* * * * *

UNITED STATES PATENT AND TRADEMARK OFFICE
CERTIFICATE OF CORRECTION

PATENT No. : 5,597,166

DATED : January 28, 1997

INVENTOR(S) : Uwe Grytz, Ulrich Vieweg

It is certified that error appears in the above-identified patent and that said Letters Patent is hereby corrected as shown below:

Column 4, line 5, after "angle" insert -- $\alpha$ --.

Column 4, line 11, after "angles" insert $\alpha$ --.

Column 6, line 23, before "ring" insert -- a --.

Signed and Sealed this

Twenty-third Day of December, 1997

*Attest:*

BRUCE LEHMAN

*Attesting Officer*     *Commissioner of Patents and Trademarks*